United States Patent
Keyani et al.

(10) Patent No.: US 9,992,287 B2
(45) Date of Patent: *Jun. 5, 2018

(54) TOKEN-ACTIVATED, FEDERATED ACCESS TO SOCIAL NETWORK INFORMATION

(71) Applicant: Facebook, Inc., Menlo Park, CA (US)

(72) Inventors: Pedram Keyani, Los Altos Hills, CA (US); George Lee, Mountain View, CA (US); Joel Benjamin Seligstein, Redwood, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/090,504

(22) Filed: Apr. 4, 2016

(65) Prior Publication Data

US 2016/0219114 A1 Jul. 28, 2016

Related U.S. Application Data

(63) Continuation of application No. 12/759,676, filed on Apr. 13, 2010, now Pat. No. 9,307,034.

(51) Int. Cl.
*G06F 15/16* (2006.01)
*H04L 29/08* (2006.01)
(Continued)

(52) U.S. Cl.
CPC ....... *H04L 67/146* (2013.01); *G06Q 20/0655* (2013.01); *G06Q 20/20* (2013.01); *G06Q 20/204* (2013.01); *G06Q 20/34* (2013.01); *G06Q 50/01* (2013.01); *H04L 67/10* (2013.01); *H04L 67/20* (2013.01); *H04L 67/28* (2013.01); *H04L 67/306* (2013.01); *H04W 4/206* (2013.01); *H04W 12/02* (2013.01)

(58) Field of Classification Search
CPC ........ G06Q 10/10; G06Q 50/01; G06Q 20/20; G06Q 30/0207; G06Q 30/0238; G06F 2221/2145; H04L 67/306; H04L 63/08; H04L 67/20
See application file for complete search history.

(56) References Cited

U.S. PATENT DOCUMENTS 9,307,034 B1 * 4/2016 Keyani ............... H04L 67/20
2005/0216300 A1 * 9/2005 Appelman ............ G06Q 10/10
705/319
(Continued)

*Primary Examiner* — David R Lazaro
(74) *Attorney, Agent, or Firm* — Baker Botts L.L.P.

(57) ABSTRACT

In one embodiment, a method includes one or more computing devices of a proxy server, in response to receiving a message from a token reader, generating a federated session token in relation to the message and sending a request for federated access to social-networking information of a first user of a social-networking system, where the request contains the federated session token. The method also includes one or more computing devices of the social-networking system, in response to receiving the request for federated access, validating the request based at least in part on one or more configuration settings associated with the first user and establishing a federated access session with the proxy server. The method also includes one or more computing devices of the proxy server, retrieving, by the federated access session, the social-networking information of the first user from the social-networking system.

21 Claims, 6 Drawing Sheets

(51) Int. Cl.
*G06Q 20/20* (2012.01)
*G06Q 20/06* (2012.01)
*G06Q 20/34* (2012.01)
*G06Q 50/00* (2012.01)
*H04W 4/20* (2018.01)
*H04W 12/02* (2009.01)

(56) References Cited

U.S. PATENT DOCUMENTS

| | | | | |
|---|---|---|---|---|
| 2008/0270038 A1* | 10/2008 | Partovi | ............... | G06Q 10/00 702/19 |
| 2008/0294607 A1* | 11/2008 | Partovi | ............... | G06Q 30/00 |
| 2008/0313714 A1* | 12/2008 | Fetterman | ............... | H04L 63/08 726/4 |
| 2009/0144392 A1* | 6/2009 | Wang | ............... | G06Q 10/10 709/217 |
| 2010/0037288 A1* | 2/2010 | Carraher | ............... | G06F 21/31 726/1 |
| 2010/0250330 A1* | 9/2010 | Lam | ............... | G06Q 30/02 705/59 |
| 2010/0274815 A1* | 10/2010 | Vanasco | ............ | G06F 17/30867 707/798 |
| 2010/0312649 A1* | 12/2010 | Lurie | ............... | G06Q 30/02 705/14.66 |
| 2011/0055030 A1* | 3/2011 | Nicolas | ............... | G06Q 20/20 705/16 |
| 2011/0106597 A1* | 5/2011 | Ferdman | ............... | G06Q 30/02 705/14.11 |
| 2011/0191200 A1* | 8/2011 | Bayer | ............... | G06Q 20/12 705/26.1 |
| 2011/0264736 A1* | 10/2011 | Zuckerberg | ............ | G06Q 30/02 709/204 |
| 2011/0265011 A1* | 10/2011 | Taylor | ............... | G06Q 50/01 715/751 |
| 2013/0159089 A1* | 6/2013 | Gil | ............... | G06Q 50/01 705/14.38 |

* cited by examiner

TOKEN-ACTIVATED, FEDERATED ACCESS TO SOCIAL NETWORK INFORMATION

PRIORITY

This application is a continuation under 35 U.S.C. § 120 of U.S. patent application Ser. No. 12/759,676, filed 13 Apr. 2010.

TECHNICAL FIELD

The present disclosure relates generally to social networking websites and other systems in which users can form connections with other users, and in particular, to integration of network-based social network system functions and information with real world physical objects and systems, such as locations, points of sale, and the like.

BACKGROUND

Social networks, or social utilities that track and enable connections between users (including people, businesses, and other entities), have become prevalent in recent years. In particular, social networking websites allow users to communicate information more efficiently. For example, a user may post contact information, background information, job information, hobbies, and/or other user-specific data to a location associated with the user on a social networking website. Other users can then review the posted data by browsing user profiles or searching for profiles including specific data. The social networking websites also allow users to associate themselves with other users, thus creating a web of connections among the users of the social networking website. These connections among the users can be leveraged by the website to offer more relevant information to each user in view of the users' own stated interests in their connections.

A system, such as a website, that allows users to interact with the system typically stores a record for each users of the system. These records may comprise information provided by the user as well as information gathered by the system related to activities or actions of the user on the system. For example, a system may require a user to enter information such as contact information, gender, preferences, interests, and the like in an initial interaction with the system, which is stored in the user's record. A user's activities on the system, such as frequency of access of particular information on the system, also provide information that can be stored in the user's record. The system may then use information provided by the user and information gathered about the user, to customize interactions of the system with the user. For example, a website selling books may keep track of a users previous purchases and provide the user with information on related books during subsequent interactions with the system. Information in a user's profile may also be used by the system to target advertisements that are of interest to the user. Using information collected from and about users results in a system that is more efficient and beneficial for both the user and the system.

However, prior systems, including websites, lack the ability to use information associated with a user's social connections or activities to customize and/or personalize the user's experience while using the system. Access to information about the user's social interactions and/or the activities of a user's social connections (e.g. friends, family, co-workers, etc.) improves the user's experience while using the system and increases the chance that the user will use the system in the future. For example, users visiting a website that sells books may be interested in books that their social connections have looked at, book reviews or comments provided by their social connections, and other social network information that might inform their purchases of book from the website. The system itself also benefits, because it can leverage information about the user and the user's social connections to more accurately determine what a user might be interested in. Such a system can use social network information to customize a user's experience and target products, services and/or advertisements to the user.

Typical systems do not possess sufficient information about a user's social connections to customize the user's experience or effectively target advertising to the user. Assembling enough information about a user's social connections for these purposes requires a system to interact with a large number of users over an extended period of time. The majority of websites will not have the resources, expertise, or user base required to build and maintain a system of the scale necessary to capture, organize and maintain a sufficient amount of information about users' social connections and their activities. Thus, users of these systems will have an inferior experience, and the customization/personalization provided by these sites is unlikely to accurately take into account or reflect information about the user's social connections and their activities.

Users typically interact with social networking systems by accessing a web site over a network using a client device, such as a desktop computer or a mobile device. Interactions between users and the social network system can be direct in that the web site that the user accesses hosts a social network application. Interactions between users and the social network system can also be indirect in that the user may access a web site of a third party, which in turn access the social networking system for information about the user for purposes of augmenting the user's experience on the third party web site. In such instances, the user typically interacts with a web site using a client device and, therefore, may be tracked or identified for purposes of authenticating and enabling access to the social network information by the user.

Figure 1:
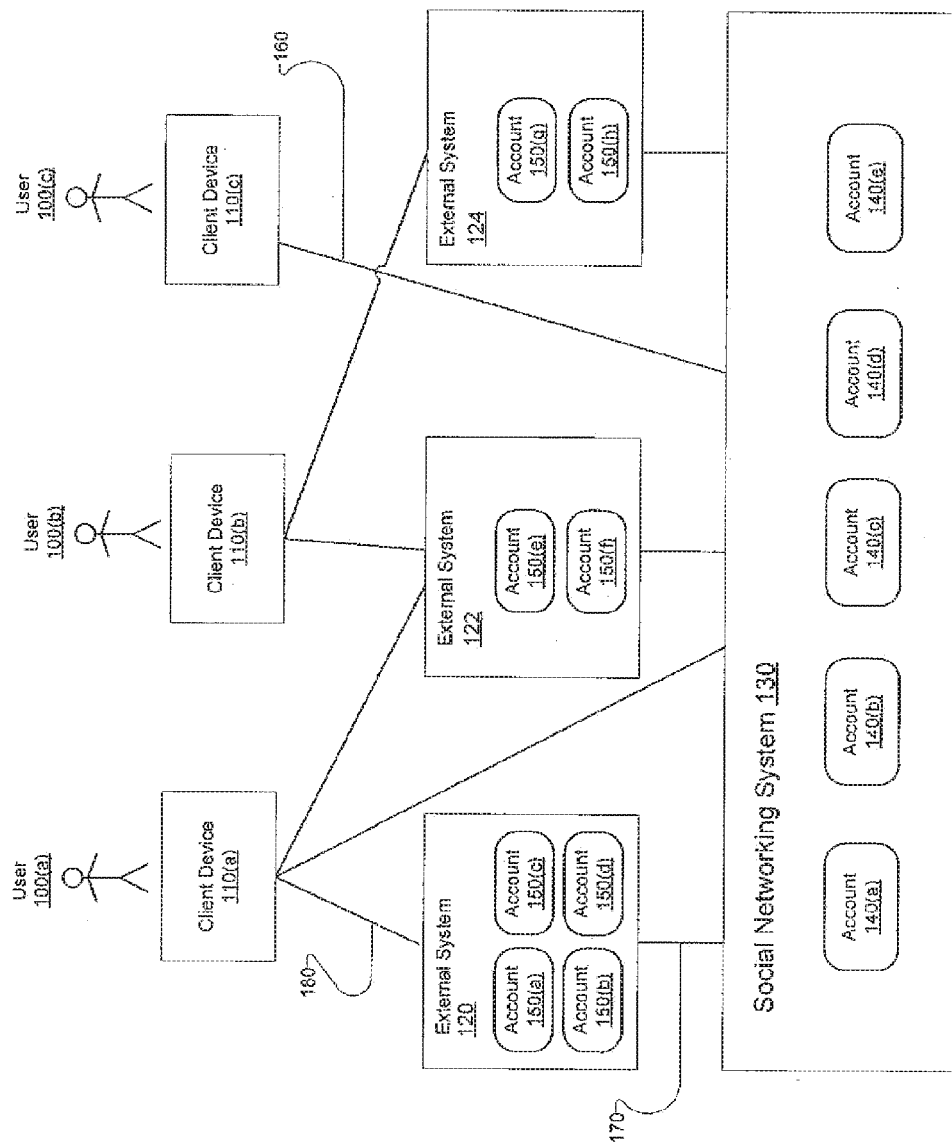
FIG. 1 is high-level diagram illustrating how external systems and the social networking system can interact to provide federated access to social network information, in accordance with one embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EXAMPLE EMBODIMENT(S)

Overview

Particular embodiments relate to a social networking environment including a social networking system and related systems that integrate social network information and access into real-world locations to augment user experiences. A social networking system offers its users the ability to communicate and interact with other users of the social networking system. Users join the social networking system and then add connections to a number of other users to whom they desire to be connected. Systems outside of the social networking system, called external systems, can access information available in the social networking system. Users of the external system can be users of a social networking system. The external system can access information from the social networking system using an Application Programming Interface (API) associated with or provided by the social networking system. Alternatively, the external system can send a markup language document to the client device with instructions for interacting with the social networking system. The external system may use the information obtained from the social networking system for various purposes. U.S. application Ser. No. 12/193,705 filed on Aug. 18, 2008; Ser. No. 12/324,761 filed on Nov. 26, 2008; Ser. No. 12/508,521 filed on Jul. 23, 2009; Ser. No. 12/508,523 filed on Jul. 23, 2009; and Ser. No. 12/508,526 filed on Jul. 23, 2009, incorporated by reference herein, describe how third-party web sites may access social network information maintained by a social networking system hosted on a separate domain. As discussed herein, federated access by external systems to social network information may be initiated based on activation or detection of a physical token, such as a credit card, an RFID badge, a bar code, QR code, a mobile device (e.g., a MAC address), and the like (including biometric identification, such as fingerprints and retinal scans). Further, a physical token can include any physical device such as a card or key fob that is both detectable by a Point of Sale (POS) terminal operated and associated with his or her social network account. For example, a user may be given a card with a code on it where the user can enter the code to associate the physical card with the his social network account, thus enabling the POS to recognize the user's social network account when it detects or recognizes the physical token (in this example, the card).

Implementations of the present invention extend these concepts by allowing federated access to social networking information of a user in various use cases where the user is not currently accessing the social networking system or a third party web site directly with a client device. As described below, a user may initiate a workflow that establishes a federated access session between a third-party system and a social networking system to allow the third-party system to augment the user's experience with social networking information without the user directly accessing either the third-party system or the social networking system.

FIG. 1 shows the interaction between a client device 110 of a user 100, external systems 120, 122, 124 and a social networking system 130. A user 100 may be a user of the social networking system 130 and/or one or more of the external systems 120, 122, 124. The social networking system 130 keeps a user account 140 for each user of the social networking system 130. An external system 120, 122, 124 may keep accounts 150 for users of the respective external system 120, 122, 124. A single user may have accounts 150 on multiple external systems 120, 122, 124; for example, user 100(a) can have an account 150(a) on external system 120, and an account 150(e) on external system 124.

External system 120 may be operated by a financial account provider, such as a credit card or debit card provider, including banks or other financial institutions. Users of external system 120 have one or more financial accounts and, in some implementations, have physical tokens (such as credit cards) that can be used in real-world locations to charge purchases against such financial accounts. External system 120, in one implementation, hosts a web site that allows users to manage their respective accounts.

External system 122 may be operated by a provider of goods and services. For example, external system 122 may correspond to an operator of a hotel or other accommodation in the hospitality environment. As FIG. 1 shows, external system 122 may include one or more Point of Sale (POS) terminals that, in some implementations, are operative to process transactions initiated with physical tokens (such as credit cards) associated with users of external system 120. External system 122 can also include other types of devices that detect or operate in connection with physical tokens, such as Radio Frequency Identification (RFID) readers, bar code and/or block code scanners, door key readers, smart card readers, wireless access points, and the like. External system 124 may be a web site that can access social network information of a user pursuant to the methods and technologies described in the U.S. patent applications identified above.

An external system 120, 122, 124 can have several users 100 that interact with the system and a user 100 can interact 180 with multiple external systems 120, 122, 124. An external system 120, 122, 124 may interact with the social networking system 130 to retrieve information available in the social networking system 130. The user 100 can also directly interact 160 with the social networking system 130. A user can link an account 150 on an external system 120, 122, 124 with the user's account 140 on the social networking system 130. A user can also link an external system 120, 122, 124 with the user's account 140 on the social networking system 130 by providing details of the external system to the social networking system 130. In this scenario, the user may not have an account on the external system 122. If an external system is not linked to the user account of social networking system 130, a request may be sent to the user to link the two accounts. The request may present an interface to the user, allowing the user to input authentication information. If the user successfully provides the authentication information the external system is linked to the social networking system 130. If a user links an external system 120, 122, 124 with the user's account 140 on the social networking system 130, the social networking system 130 may store information related to the external system 120, 122, 124 (including the users activities on the external system 120, 122, 124) along with the account 140 of the social networking system 130. The information related to linked external systems stored by the social networking system 130 is used in an embodiment by the social networking system 130 to facilitate the process of the user logging into multiple external systems 120 (and can also be used for other purposes, including to customize or enhance the user's experience on the social networking system, to target advertisements, etc.).

In an embodiment, the login status of all the external system 120 linked to the social networking system 130 is treated as the same. Accordingly, if a user logs into any one of the external systems 120, the login status for all the external systems 120 (that have been linked by the user with the account on the social networking system) is assumed to be "logged in." Similarly, if the user logs out of any one of these external systems 120, the login status for all the external systems 120 is assumed to be "logged out." The login status for all the linked external systems 120 is stored in the social networking system 130. In some implementations, an external system 122, on which a given user does not have an account or an account that is linked with social networking system 130, may be provided with federated access to an account 140 of social network system 130 via other external systems, such as external system 120, as discussed below. In such systems, the login status of the user may be unaffected by such federated access.

In an embodiment, the social networking system 130 maintains a login status of the user 100 in the user account 140 when the user logs into any of the external systems 120. If the user is not logged into any of the external systems 120, the login status of the user indicates "not logged in." If the user attempts to access social network information from an external system 124, for example, the user is requested to provide authentication information for the social networking system 130. If the user successfully authenticates, the login status of the user in the social networking system 130 is changed to "logged in." If the user attempts to access any other external system 120, for example, the login status of the user in the social networking system 130 is checked. If the login status of the user is determined to be "logged in," the user is allowed access to the external system 120. Hence the user is able to access social network information from multiple external systems 120 by authenticating into the social networking system 130 once.

In accordance with an embodiment of the invention, the external system 120, 122, 124 can access social networking system 130 information or provide information to the social networking system 130 using an Application Programming Interface (API) associated with or provided by the social networking system 130. Alternatively, an external system 120, 122, 124 may send a markup language document to the client device 110 with instructions for accessing the social networking system 130. The client device 110 processes the instructions in the markup language document and accesses the social networking system 130 for either providing information or retrieving information. The external system may obtain information from the social networking system 130 for various purposes. For example, the external system may present activities of a user's connections on the external system to the user. The external system may also send information related to the user's activities performed on the external system to the social networking system 130. For example, information related to purchases made by a user on an external system may be sent to the social networking system. The information related to purchases made by the user in the external system can be made available to connections of the user in the social network as a form of social advertisement.

The social networking system 130 maintains information about connections among its users. As used herein, the term "connection" refers to any other user (whether an individual or other entity) of the social networking system to whom a user has formed a connection, association, or relationship via the social networking system. Connections may be added explicitly by a user or automatically created by the social networking system based on common characteristics of the users (e.g., users who are alumni of the same educational institution). Connections in social networks can be one or two-way connections. For example, if Bob and Joe are both users and connected to each other in the website, Bob and Joe have a two-way connection. If Bob is interested in learning more information about Joe, but there is not a reciprocal connection, a one way connection may be formed with Bob being connected to Joe, but Joe not being connected to Bob. The connection between users may be a direct connection; however, some embodiments of a social network allow the connection to be indirect via one or more levels of connections. The social networking system keeps a record of information for each user and the connections among the users. The record of users and their connections in the social networking system may be called a "social graph."

System Architecture

Figure 2:
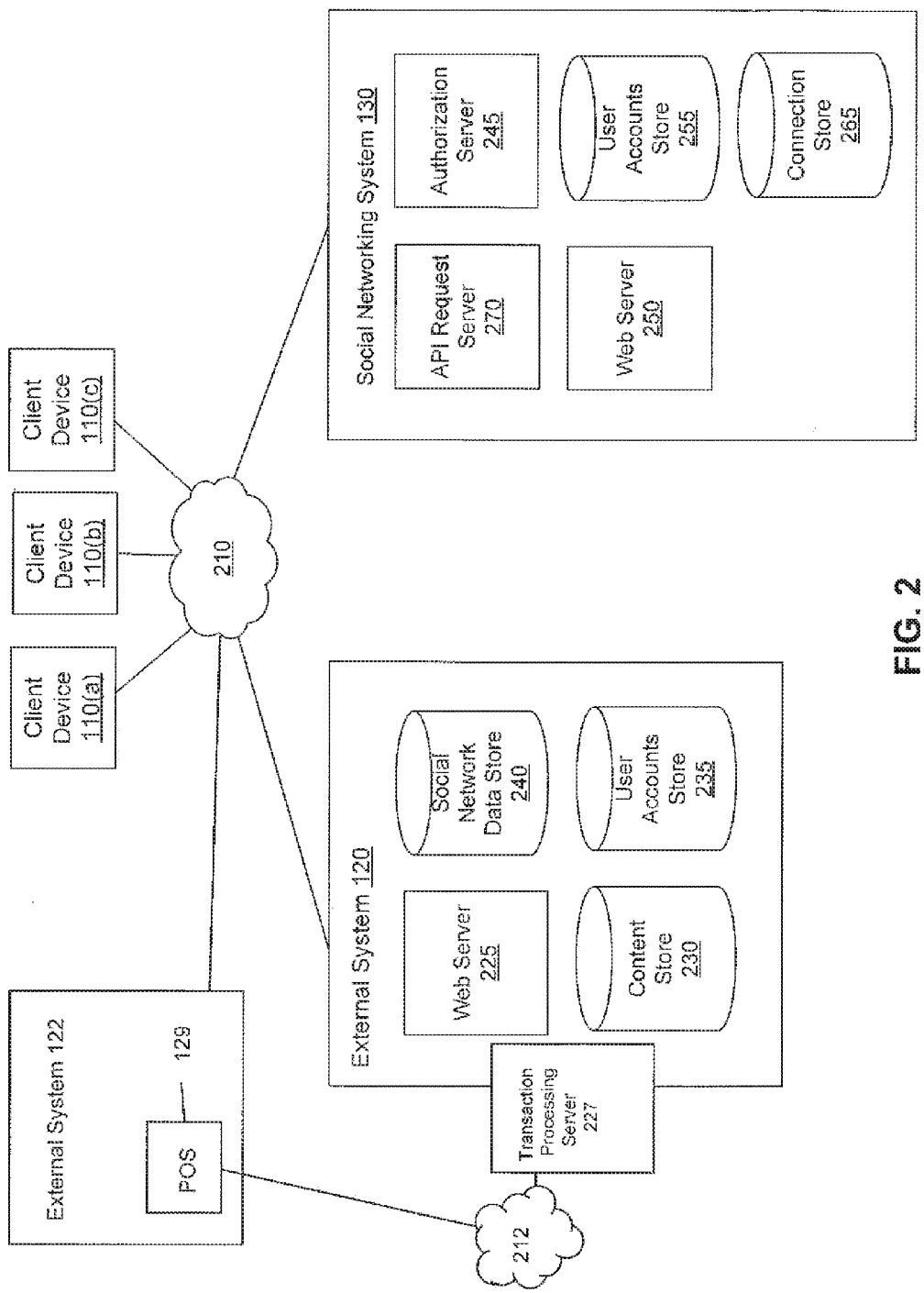
FIG. 2 is a diagram of the system, in accordance with an embodiment of the invention.

FIG. 2 is a high level block diagram illustrating a system environment suitable for allowing a user to access multiple external systems 120, 122, 124 that interact with a social networking system 130 for retrieving social network information. The system environment, in one example implementation, comprises one or more client devices 110, one or more external systems 120, 122, a social networking system 130, and networks 210, 212. Network 210 may be a wide area, packet-based network such as the Internet, while network 212 may be a different network type, such as a transaction processing network. In some implementations, network 212 may be a logical overlay network implemented over network 210, such as an encrypted network and/or IP-based transaction processing network. In alternative configurations, different and/or additional modules can be included in the system.

The client devices 110 comprise one or more computing devices that can receive user input and can transmit and receive data via the network 210. For example, the client devices 110 may be desktop computers, laptop computers, smart phones, personal digital assistants (PDAs), or any other device including computing functionality and data communication capabilities. The client devices 110 are configured to communicate via network 210, which may comprise any combination of local area and/or wide area networks, using both wired and wireless communication systems.

FIG. 2 contains a block diagram of the social networking system 130. The social networking system 130 includes a web server 250, an API request server 270, an authorization server 245, a user accounts store 255, and a connection store 265. FIG. 2 also contains a block diagram of the external system 120. The external system 120 includes a web server 225, a content store 230, a user accounts store 235, and a social network data store 240. In other embodiments, the social networking system 130 or the external system 120 may include additional, fewer, or different modules for various applications. Conventional components such as network interfaces, security mechanisms, load balancers, failover servers, management and network operations consoles, and the like are not shown so as to not obscure the details of the system.

The social networking system 130 comprises a computing system that allows users to communicate or otherwise interact with each other and access content as described herein. The social networking system 130 stores user information in user accounts store 255, for example, user profile information including biographic, demographic, and other types of descriptive information, such as work experience, educational history, hobbies or preferences, location, and the like. The social networking system 130 further stores data describing one or more connections between different users in the connection store 265. The connection information may indicate users who have similar or common work experience, group memberships, hobbies, or educational history. Additionally, the social networking system 130 includes user-defined connections between different users, allowing users to specify their relationships with other users. For example, these user-defined connections allow users to generate relationships with other users that parallel users' real-life relationships, such as friends, co-workers, partners, and so forth. Users may select from predefined types of connections, or define their own connection types as needed.

The social networking system 130 maintains a user profile for each user of the system. Actions that a particular user takes with respect to another user or data objects are associated with each user's profile. Such actions may include, for example, adding a connection to the other user, sending a message to the other user, reading a message from the other user, viewing content associated with the other user, attending an event posted by another user, among others. The social networking system 130 may also enable users to add applications to their profiles. These applications provide enhanced content and interactivity within the social networking system 130, which maintains an application object for each application hosted in the system. The applications may be provided by the website operator and/or by third party developers. An example application is an enhanced messaging service, in which users can send virtual objects (such as a "gift" or "flowers") and an optional message to another user. The use of any functionality offered by the application may thus constitute an action by the user in connection with the application. In addition, continuing the example from above, the receipt of the virtual gift or message may also be considered an action in connection with the application 120. It can therefore be appreciated that actions may be passive and need not require active participation by a user. Still further, one or more of the user profiles may have a virtual currency account associated therewith. For example, by using a credit card or by performing requested actions, a user may accumulate virtual currency, such as credits, that can be redeemed for value with external systems or social networking system 130.

In another embodiment, the social networking system 130 logs actions taken by its users in the real world. These actions may be recorded by an action terminal, which observes qualifying actions and then communicates that action to the social networking system 130. The communication may be via email, SMS, or any other appropriate means, where the communicated message includes sufficient information for the social networking system 130 to populate an action log with an entry describing the action. The action terminal may comprise any suitable devices or systems for the particular type of action to be tracked.

The web server 250 links the social networking system 130 via the network 210 to one or more client devices 110; the web server 250 serves web pages, as well as other web-related content, such as Java, Flash, XML, and so forth. In some embodiments, the web server may be used for communicating with the external system 120. For example, requests sent by the external system 120 can be received by the web server 250 and processed. The web server 250 may include a mail server or other messaging functionality for receiving and routing messages between the social networking system 130 and the client devices 210. The messages can be instant messages, queued messages (e.g., email), text and SMS messages, or any other suitable messaging technique.

The API request server 270 allows external systems to access information from the social networking system 130 by calling APIs. The API request server 270 may also allow external systems 120 to send information to social networking system 130 by calling APIs. An external system 120 sends an API request to the social networking system 130 via the network 210. The API request is received at the social networking system 130 by the API request server 270. The API request server 270 processes the request by calling the appropriate program code to collect any appropriate response, which is then communicated back to the external system 120 via the network 210. In an embodiment, the web server 250 receives a request and calls the API server 270 in order to process the request. The information based on the response from the API server 270 is sent in response to the request received by the web server 250. A device that does not communicate with the web server 250 can communicate directly with the API request server 270 to obtain information.

The authorization server 245 enforces the privacy settings of the users of the social networking system. The privacy setting of a user determines how particular information associated with a user can be shared. The privacy setting comprises the specification of particular information associated with a user and the specification of the entity or entities with whom the information can be shared. The entities with which information can be shared may include other users, applications, external systems, or any entity that can potentially access the information. The information that can be shared by a user comprises user profile information photos, videos, links, text entries, phone numbers associated with the user, user's connections, actions taken by the user such as adding a connection, changing user profile information, and any other information maintained by the social networking system that is associates with the user. Systems and methods for allowing an external system to access information in a social networking system using APIs that enforce privacy settings defined in the social networking system are disclosed in U.S. application Ser. No. 12/324,761, filed Nov. 26, 2008, which is incorporated by reference in its entirety. Systems and methods for allowing users to control accessibility of content in a social networking system is disclosed in U.S. application Ser. No. 12/485,856 filed on Jun. 16, 2009, which is incorporated by reference in its entirety. Systems and methods for providing privacy settings for applications associated with a user profile are disclosed in Ser. No. 12/154,886 filed on May 27, 2008, which is incorporated by reference in its entirety.

Figure 3:
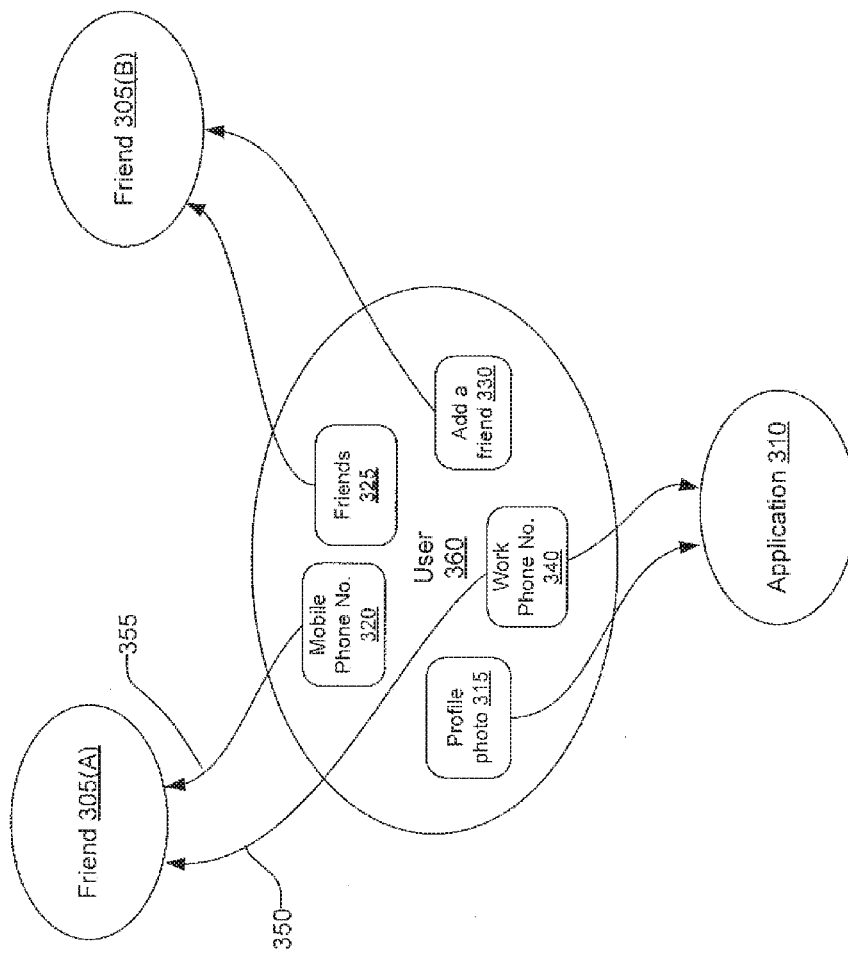
FIG. 3 is an example diagram of privacy settings of a user of a social network, in accordance with one embodiment of the invention.

FIG. 3 illustrates an example of how the privacy settings of a user 360 of the social networking system 130 control the accessibility of information associated with the user 360 to the user's friends 305 or applications 310. As shown in FIG. 3, the arrow 350 indicates that friend 305(A) is allowed to access the work phone number 340 of user 360, and arrow 355 indicates that friend 305(A) is allowed to access the mobile phone number of the user 360. Friend 305(A) does not have access to information such as profile photo 315 of the user 360 or the user's friends list 325. On the other hand, friend 305(B) is allowed to access the friends list 325. The information associated with a user includes actions taken by a user such as the action of adding a new friend 330. The user 360 can completely block another user or an application from accessing any information associated with the user 360. A user or an application that is blocked by the user 360 does not have access to any information associated with user 360.

As discussed above, the social networking system 130 maintains data about objects with which a user may interact. To this end, the user accounts store 255 and the connection store 265 instances of the corresponding type of objects maintained by the social networking system 130. Each object type has information fields that are suitable for storing information appropriate to the type of object. For example, the user account store 255 contains data structures with fields suitable for describing a user's profile, the login status of a user, and the user accounts in external systems 120 that are linked to a corresponding account in the social networking system 130. When a new object of a particular type is created, the social networking system 130 initializes a new data structure of the corresponding type, assigns a unique object identifier to it, and begins to add data to the object as needed. This might occur, for example, when a user becomes a user of the social networking system 130, the social networking system 130 generates a new instance of a user account in the user account store 255, assigns a unique identifier to the user account, and begins to populate the fields of the user account with information provided by the user.

The web server 225 of the external system 120 links the external system 120 via the network 210 to one or more client devices 110; the web server 225 serves web pages, as well as other web-related content, such as Java, Flash, XML, and so forth. The content presented to the client device 205 is stored in the content store 230. In some embodiments, the web server 225, or other networked computing device, may be used for interacting with the social networking system 130. For example, requests and responses sent by the social networking system 130 can be received by the web server 225 for processing.

The external system 120 maintains a user accounts store 235 to maintain data associated with accounts of users of the external system 120. The user accounts store 235 may store information associated with a user including user name and password, as well as other information relevant to the external system 120. For example, email address, mailing address, and billing information. In some embodiments, the external system 120 can also store additional information, including user actions or interests, or any other information gathered by the external system associated with user.

In one implementation, external system 120 corresponds to a financial services entity that maintains financial accounts for users. As shown in FIG. 2, external system 120 may include a transaction processing server 227 that is operable to interact with one or more point of sale (POS) terminals 129 of external system 122 to process credit and/or debit card transactions. External system 122 may correspond to a location owned or operated by a provider of goods and services, such as a hotel. External system 122 may include its own web servers and databases, as well as other networked systems, including pay-per-view and other video distribution systems, registration and reservation management systems and the like.

In one embodiment, a user of the social networking system 130 that holds an external financial account, such as a credit card account with external system 120, may access external system 120 and opt-in by registering his or her account on social networking system 130. When the registered credit card is used in a qualifying way (e.g., a purchase made at a point of sale), the credit card company (or clearinghouse) sends a message to the social networking system 130. In this scenario, a computing system at the credit card company or clearinghouse serves as an action terminal to generate a message describing the user's activities. The message may contain information about the credit card transaction, such as the item purchased, the date, and location of the purchase. The social networking system thus tracks real-world actions such as this purchase in the action log 160.

Federated Access to Social Network Information

Figure 4:
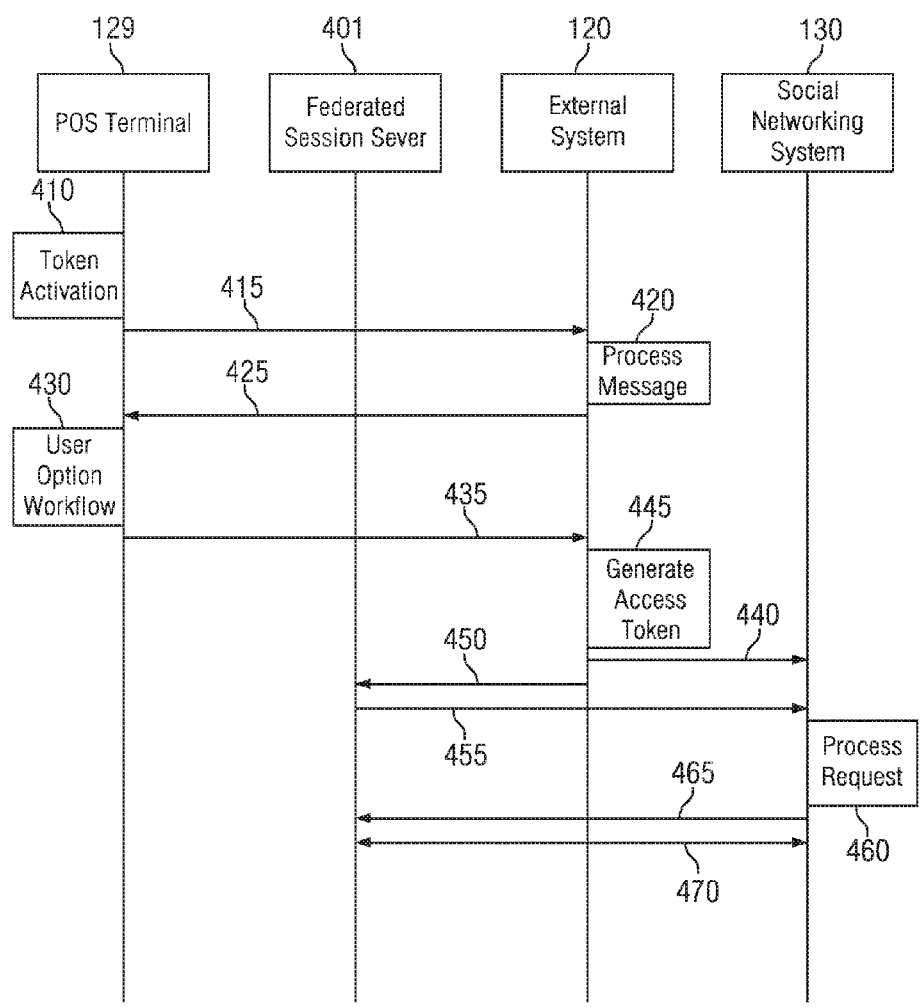
FIG. 4 is an interaction diagram of a process for providing federated access to social network information, in accordance with an embodiment of the invention.

FIG. 4 is an interaction diagram of a process in which utilization of a physical token causes a third party external system to be provided with federated access to social network information that can be used to enhance a user's experience at a location outside the context of a user accessing a third party web site or the social networking system 130 with a client device. The user 100 utilizes 410 a physical token, such as a credit card, at POS terminal 129 to initiate a transaction or some other action, such as pre-authorizing a charge to the user's credit card account. POS terminal 129 transmits 415 a message to external system 120, which in this example embodiment, is a credit card company or financial institution. External system 120 processes 420 the transaction message. In one implementation, external system 120 may access the account of the user identified in the transaction message to determine whether the user has registered an account corresponding to social networking system 130. If so, external system 120 may include, in a response message transmitted 425 back to POS terminal, an indication that the user has the option to grant federated access to social network information of the user to allow external system 120 to integrate his or her experience at a location corresponding to the external system 120 with social networking system 130. In one implementation, the operations discussed above may be integrated with the transaction authorization and processing workflow implemented between POS terminal 129 and external system 120. For example, the message transmitted by the POS terminal to external system 120 may be a request to authorize a transaction. The response transmitted by the external system 120 may be an authorization response with the indication mentioned above.

The POS terminal 129, responsive to the indication, may present 430 a screen to the user (or an operator of the POS terminal 129) that the user has the option to grant an external system with federated access to social network information of the user, such as to connect his or her experience with social networking system 130. For example, in addition to an authorization screen in which a user may input a signature or a Personal Identification Number (PIN), a user may be presented with selectable options, such as "Do you wish to update your status on Facebook?," and "Do you want your Facebook News Feed forwarded to your hotel room television?", "Do you want us to look to see if your friends are nearby?," and the like. The user may make a selection of one or more options, which the POS terminal 129 communicates 435 to external system 120. In some implementations, a user may be offered incentives to select certain options. For example, the user may be offered a discount on the services or products to be purchased, if the user elects to post a desired status message to his or her profile, such as "User X has just checked in to the Socially Connected Hotel." In one implementation, the POS terminal 129 may also ask the user to confirm his or her user account identifier and password. In one implementation, the message transmitted from POS terminal 129 to external system 120 may include an indication of the options selected by the user and a computer network address information (such as a Uniform Resource Locator (URL) or an Internet Protocol (IP) address) of a target host (here, a federated access server 401) for granting federated access to social networking system 130 on behalf of the user.

As FIG. 4 shows, external system 120 may also interact directly with social networking system 130 in response to the message. For example, if the message indicates that the user desires to update his or her status as "Just checked in to my hotel room at Connected Hotel," external system 120 may make an API call 440 to social networking system 130 to post this information. In one implementation, the API call may be included in a message that has been digitally signed by the external system 120. External system 120 may employ one-way hash functions to generate the digital signature, such as SHA-1 or MD5, etc.

External system 120, in response to the message sent from POS terminal 129, may also generate 445 a federated session token and transmit the token to the end system (in FIG. 4, called a federated session server 401) corresponding to the computer network address information transmitted 435 by POS terminal 129. In one implementation, the federated session token is a digitally signed token that permits federated session server 401 to access social network information associated with the user 100. In one implementation, the federated access token may include one or more of an identifier corresponding to the user (used by social networking system 130 to identify an account), computer network address information corresponding to federated access server 401, indications of one or more access options selected by the user, and metadata describing the activities of the user at the location corresponding to external system 122. In one embodiment, the activities metadata may be entered by the user either at the POS or using a keyboard or touch screen on the physical token itself. In another embodiment, the activities metadata may be known by virtue of the POS terminal. For example, the POS terminal could have known associated metadata when the user's physical token is recognized such as the geo location, the type or genre of location (restaurant, hotel, bank), the date, time, etc. External system 120 may transmit 450 the federated access token to federated access server 401. Federated access server 401 may in turn transmit 455 a request, appended with the federated access token, to open a federated session with social networking system 130. Social networking system 130, in one implementation, having a trust relationship with external system 120, validates 460 the federated access token by verifying the digital signature generated by external system 120. If the federated access token is authenticated, social networking system 130 establishes 460 the federated access session, transmitting 465 a response to federated access server 401. In one implementation, the response transmitted to federated access server 401 may include one or more parameters associated with the session, such as encryption parameters (cypher suites, etc.), as well as a time limit for the federated access session 470. Thereafter, federated access server 401 may then access social network information of the user over federated access session 470. Social networking system 130 may also generate and transmit a notification to the user that a federated access session has been established. This notification can be transmitted in an email, a Short Message Service (SMS) message, and the like. In one implementation, the user may be prompted to respond to the message in order to keep the federated access session alive. In some implementations, the message may also include links or instructions to the user that allow the user to terminate the federated access session, as well. In some implementations, if the user's login status indicates that the user is logged in with a mobile device, social networking system 130 may push a notification to the user's client device 110.

Federated access server 401, via the federated access session 470, may access social network information associated with the user to augment the user's experience at a physical location, such as a hotel, and also post activities of the user at the location. For example, federated access server 401 may request a news feed for the user and then forward the news feed or live feed for display by a set-top box and television in the user's hotel room. Alternatively, the federated access server 401 may request pictures associated with the user and/or the user's friends and forward them to a set-top box for display. Federated access server 401 may also access social networking system 130 to identify which other of the user's friends may also be at the same location and notify the user of such friends. The user's friends may also be similarly notified. In addition, the user, using the set-top box and an associated remote control (for example), may access and/or change one or more aspects of his or her user profile (e.g., changing status, profile attributes, modifying friends list, and the like) or otherwise access the system, such as causing the set top box to navigate to another user page and/or entering a wall post or other message.

A variety of other implementations are possible. For example, in other implementations and as detailed below in connection with FIG. 6, the access token and corresponding user identifying information may be more directly associated with or at least maintained social networking system 130. In such an embodiment, the POS terminal 129 or other access token reader may interact directly with social networking system 130 to provide an external system 122 with federated access to social network information of the user. In some implementations, the federated access server 401 may act as a proxy or gateway allowing other systems of external system 122 to obtain social network information of the user. For example, as discussed above, one example end system is a set-top box, which may access social network information of the user, through federated access server 401. Other end-systems may include IP-enabled televisions (IPTVs), network-enabled picture displays, hotel/restaurant reservation systems, and the like. In other implementations, the access token reader may also be connected to a digital camera that is operative to capture a picture of the user. The captured digital image can be provided to federated access server 401 to upload to social networking system 130 in order to post the picture to a profile of the user.

In an embodiment, a subset of the social network information requested by federated access server 401 may be provided by the social networking system 130 based on privacy settings of the users of the social networking system 130. For example, the privacy settings may restrict the information that an external system 122 is allowed to access. The social network information provided to the external system is the subset of the requested information that the external system 122 is allowed to access based on the user's privacy settings. Furthermore, the social network information requested may be information associated with the connections of the user in the social networking system 130. The subset of social network information provided to the external system is determined based on the privacy settings of the user as well as the privacy settings of the user's connections in the social networking system 130. The enforcement of the privacy settings ensures that a user who is not allowed to see specific information associated with another user within the social networking system is not allowed to see the same information outside of the social networking system context, for example, using an external system 122.

In an embodiment, the privacy settings are not enforced by the social networking system 130 and the information requested by the federated access server 401 is sent by the social networking system 130 along with the privacy setting information of the users of the social networking system. The external system enforces the privacy settings information of the users of the social networking system and makes sure that a user who is not allowed to see specific information within the social networking system is not allowed to see the same information in the external system. In another embodiment, specific types of privacy settings may be enforced by the social networking system 130, whereas other types of privacy setting information may be communicated to the external system and enforced by the external system.

The information generated by the system described above can be utilized in a variety of ways. For example, external system 122 may access the user's social network information to assist in selecting one or more advertisements to display to the user. Rather than simply deliver an advertisement that is targeted to a particular user based on the user's preferences as, for example, declared by the user in the user's profile page, particular embodiments can present advertisements that communicate information about, or take into account, actions taken by the user as well as potentially other users in the user's network (i.e., the user's friends and other relationships and connections in the social networking website). Furthermore, the actions taken by users can be correlated to the vast array of information attributes that the social network system maintains in order to improve analytical and targeting processes as well as the user experience with the social networking environment.

In particular embodiments, the social networking system 130 receives messages from one or more end systems associated with federated access server 401 that communicate the actions taken by users while using a set top box, for example. More particularly, in various example embodiments, when a user takes one or more actions using a set top box, for example, watching a particular television show, the federated access server 401 may transmit an indication of the media consumed to social networking system 130. In particular embodiments, these parameters are logged by the social networking system 130, analyzed, and can be correlated to logged activity history of the user. Depending on the user's privacy settings, one or more of these activities may also be posted to a user's status or otherwise added to the user's profile.

Figure 6:
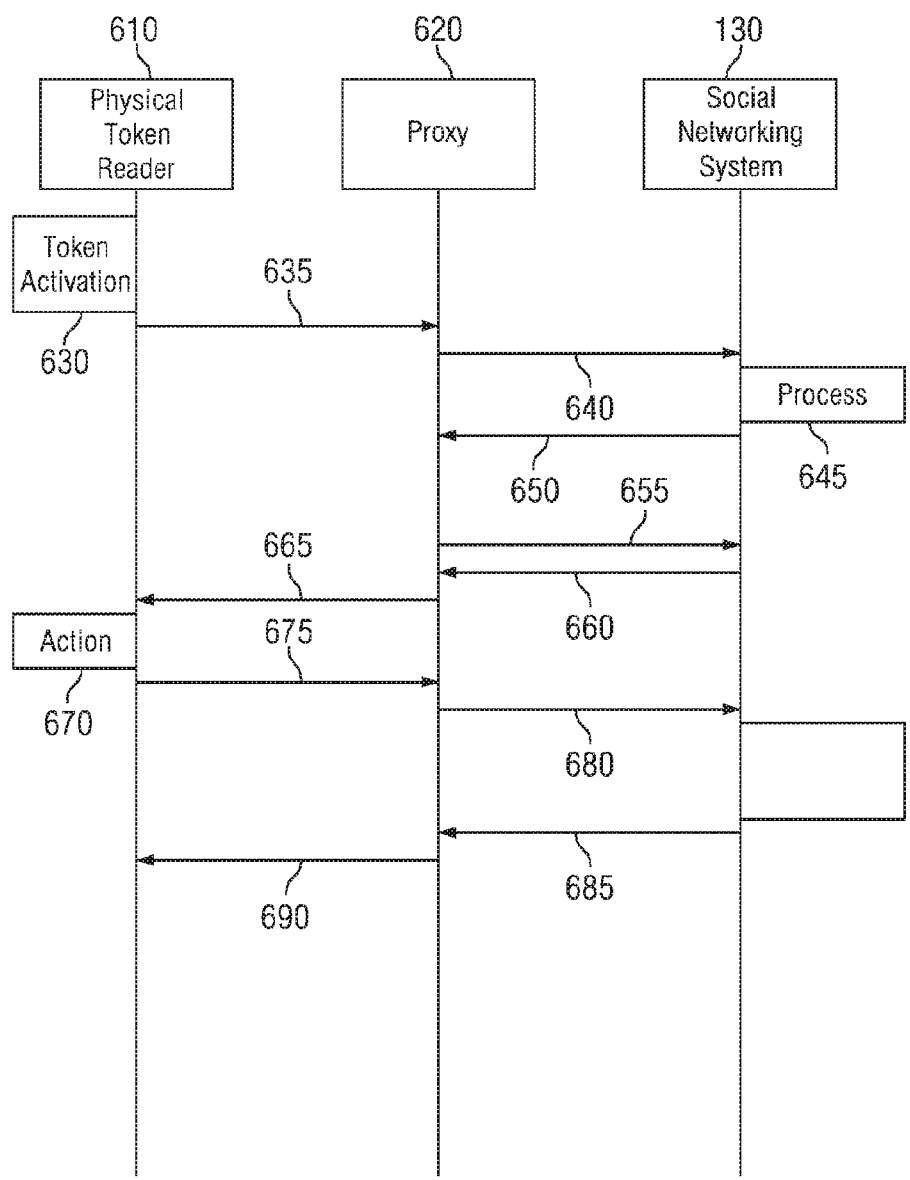
FIG. 6 is an interaction diagram of a process for providing federated access to social network information, in accordance with another embodiment of the invention.

FIG. 6 illustrates the elements and process flow associated with another embodiment of the present invention. As FIG. 6 illustrates, token activation 630 causes a physical token reader 610 to transmit a token activation message to a proxy (federated access) server 620. In one implementation, the token activation message includes a token identifier and a physical token reader identifier. In the implementation shown, the proxy 620 may forward the token activation message 640 to social networking system 130. The proxy 620 may also operate to look up various information associated with the reader identifier, as geographic location, date, time, and the like, and append this information to the token activation message 640. Alternatively, the proxy 620 may use the token reader identifier for its internal purposes and replace it with one or more application identifiers prior to forwarding the token activation message to the social networking system 130. As a non-limiting example, proxy 620 may map the token reader identifier to one or more application identifiers and transmit the token identifier and one or more application identifiers in addition to, or in lieu of, the token reader identifier and the token identifier. Still further, proxy 620 may encrypt (using a private key, for example) and/or digitally sign the token activation message and include a replay protection counter in the encrypted message to protect against replay attacks, prior to forwarding the message to social networking system 130.

Social networking system 130, in one implementation, may process the token activation message 645 in a manner similar to a login request, such as decrypting the message with a public key of the proxy, verifying the replay protection counter, and the like. Furthermore, in one implementation, social networking system 130 maintains a database of information that is operative to resolve a user identifier corresponding to a user account based on the token identifier. Social networking system 130 also maintains a database of information that resolves entity information associated with the reader identifier. For example, the reader identifier may correspond to a known location or a known physical system, such as an information kiosk, a physical entryway, a lobby, a check-in counter, a vending machine and the like. One or more of the reader identifiers may also be associated with a concept or informational page hosted by social networking system 130. Still further, the reader identifier may also map to a third-party application hosted on proxy 620 or social networking system 130. In such an implementation, the third party application may be initiated in response to the token activation message. In addition, identification of a third-party application, such as a hotel login or registration application, may also map to user privacy settings that a user has previously configured for the application, such as disallowing access to certain types of user data, permitting only certain types of messages to be posted to a user profile, and the like. Mapping reader identifiers or proxies themselves to applications allows for the development of applications that can act as proxies for the user, such as uploading content, posting status messages, as well as accessing content, such as news feeds and other information that is otherwise accessible to the user. Furthermore, mapping proxy 620 or readers 610 to applications allows for the user to selectively configure privacy settings for the applications on an individualized basis.

Social networking system 130, in one implementation, may identify a user associated with the token identifier to validate the token. The social networking system 130 may also access privacy and other configuration settings of the user to determine whether to grant federated session access to the proxy 620. For example, the social networking system 130 may map the reader identifier, as discussed above, to a network application to determine whether the user corresponding to the token has granted the required access permissions. If so, the social networking system 130 may transmit a session login response 650 to proxy 620. In one implementation, the session login response may include a session identifier as well as an access token, such as a digitally signed token.

After the proxy 620 receives a valid session login response, it may perform a variety of actions. In some implementations, the proxy 620 may access the reader identifier to determine what operations should be performed. For example, if the physical token reader 610 corresponds to a check-in counter, the proxy 620 may post a message 655 to the profile of the user indicating that the user has checked in to a hotel or conference. In some implementations, the proxy 620 may transmit a request to post a photograph or other content associated with the reader 610. In one implementation, the social networking system 130 may access privacy settings to authorize the request. If the request is authorized, the social networking system may transmit an authorization or acknowledgment message 660 to proxy 620. In response, proxy 620 may forward the message 665 to reader 610. Reader 610 equipped with, or connected to a camera, may perform a requested action 670, such as taking a picture of the user and transmit the picture 675 to proxy 620, which uploads the photograph 680 to social networking system 130 for display on the user's profile page and possibly newsfeeds of other users. Depending on the type of transaction, social networking system 130 may transmit an acknowledgement 685 to proxy 620, which proxy may optionally forward to reader 610.

A variety of other actions can be taken at the reader 610. For example, the reader 610, in connection with the proxy 620, may step the user through an authorization workflow where the user authorizes proxy 620 to debit a virtual currency account associated with the user in exchange for a product or service. In other embodiments, the reader 610, in connection with the proxy 620, may step the user through an authorization workflow where the user authorizes proxy 620 to credit a virtual currency account associated with the user in exchange for performing some action, such as allowing a post on a user's wall with new status information to advertise the user's presence at a particular location to other users. In other embodiments, the reader 610, in connection with the proxy 620, may step the user through an authorization workflow where the user becomes a fan of a particular page hosted by social networking system 130.

Other implementations are possible. In one such implementation, the functions of the reader 610 and one or more of the functions of the proxy 620 may be combined into one physical system, possibly obviating the need for one or more of the message flows illustrated in FIG. 6. Furthermore, the proxy 620 may be hosted locally proximally to the reader 610, at social networking system 130, or at an intermediate device.

In summary, as a result of the foregoing, a federated access session can be established upon a simple swipe of a card or other type of activation by a user, allowing a proxy 620 to interact with social networking system 130 on the user's behalf. As discussed above, the proxy 620 can operate to augment a user's experience at one or more locations.

Embodiments of the invention have been described in the context of social networking websites. However, the techniques described herein may be applied to a number of other types of websites that are not necessarily concerned with social networking. Such websites include any website that tracks any kind of information about users of the website and then provides that information to other users. For example, a retail website may keep track of users who make purchases from the website, then communicating the information about some of its users to other users using the techniques described herein.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, although the foregoing embodiments have been described in the context of a social network system, it will apparent to one of ordinary skill in the art that the invention may be used with any electronic social network service and, even if it is not provided through a website. Any computer-based system that provides social networking functionality can be used in accordance with the present invention even if it relies, for example, on e-mail, instant messaging or other form of peer-to-peer communications, and any other technique for communicating between users. The invention is thus not limited to any particular type of communication system, network, protocol, format or application.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

While the foregoing processes and mechanisms can be implemented by a wide variety of physical systems and in a wide variety of network and computing environments, the server or computing systems described below provide example computing system architectures for didactic, rather than limiting, purposes.

Figure 5:
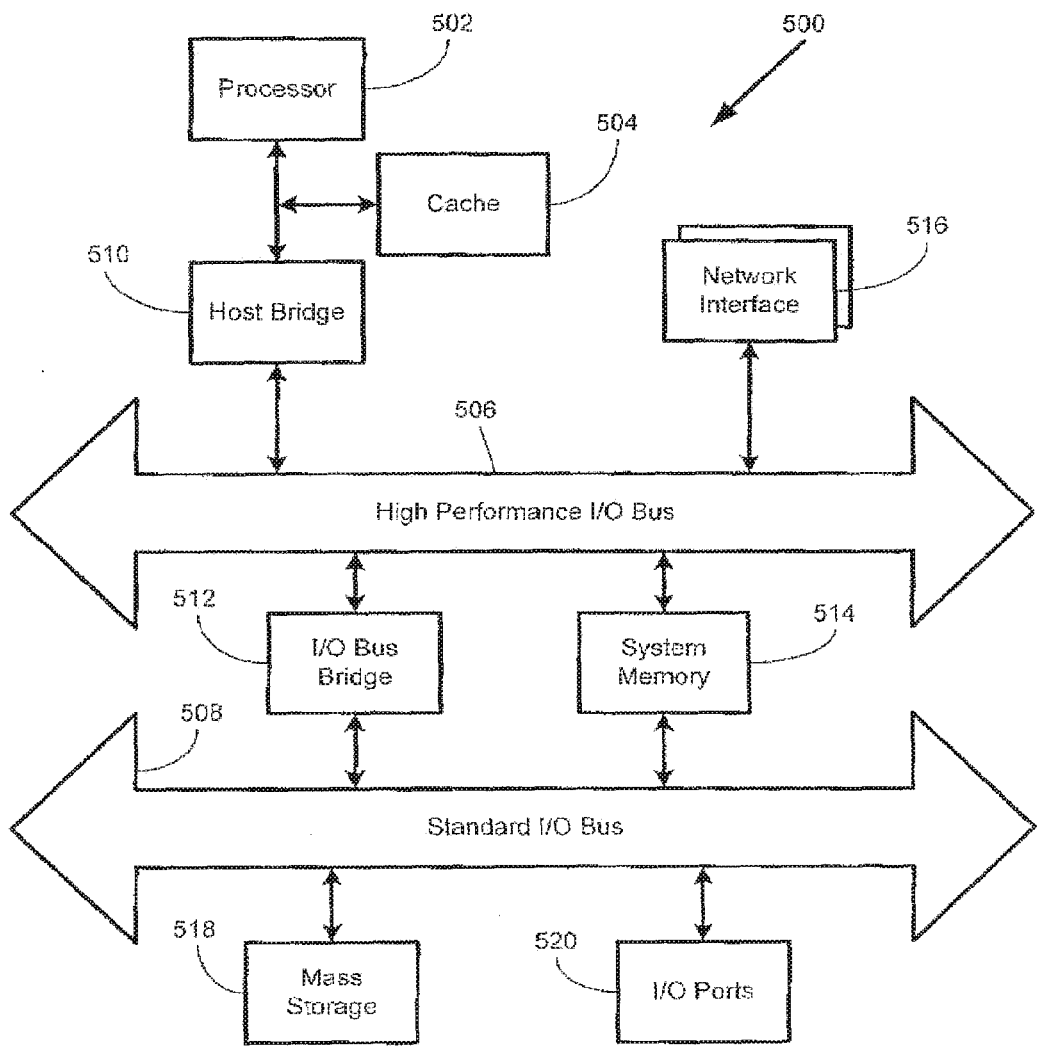
FIG. 5 is a diagram of a computer system architecture, in accordance with an embodiment of the invention.

FIG. 5 illustrates an example computing system architecture, which may be used to implement one or more of the computing devices identified above, such as federated access server 401. In one embodiment, hardware system 500 comprises a processor 502, a cache memory 504, and one or more executable modules and drivers, stored on a computer readable medium, directed to the functions described herein. Additionally, hardware system 500 includes a high performance input/output (I/O) bus 506 and a standard I/O bus 508. A host bridge 510 couples processor 502 to high performance I/O bus 506, whereas I/O bus bridge 512 couples the two buses 506 and 508 to each other. A system memory 514 and one or more network/communication interfaces 516 couple to bus 506. Hardware system 500 may further include video memory (not shown) and a display device coupled to the video memory. Mass storage 518, and I/O ports 520 couple to bus 508. Hardware system 500 may optionally include a keyboard and pointing device, and a display device (not shown) coupled to bus 508. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 500 are described in greater detail below. In particular, network interface 516 provides communication between hardware system 500 and any of a wide range of networks, such as an Ethernet (e.g., IEEE 802.3) network, a backplane, etc. Mass storage 518 provides permanent storage for the data and programming instructions to perform the above-described functions implemented by the respective computing systems identified above, whereas system memory 514 (e.g., DRAM) provides temporary storage for the data and programming instructions when executed by processor 502. I/O ports 520 are one or more serial and/or parallel communication ports that provide communication between additional peripheral devices, which may be coupled to hardware system 500.

Hardware system 500 may include a variety of system architectures; and various components of hardware system 500 may be rearranged. For example, cache 504 may be on-chip with processor 502. Alternatively, cache 504 and processor 502 may be packed together as a "processor module," with processor 502 being referred to as the "processor core." Furthermore, certain embodiments of the present invention may not require nor include all of the above components. For example, the peripheral devices shown coupled to standard I/O bus 508 may couple to high performance I/O bus 506. In addition, in some embodiments, only a single bus may exist, with the components of hardware system 500 being coupled to the single bus. Furthermore, hardware system 500 may include additional components, such as additional processors, storage devices, or memories.

In one implementation, the operations of the nickname generating process described herein are implemented as a series of executable modules run by hardware system 500, individually or collectively in a distributed computing environment. In a particular embodiment, a set of software modules and/or drivers implements a network communications protocol stack, parallel computing functions, nickname generating processes, and the like. The foregoing functional modules may be realized by hardware, executable modules stored on a computer readable medium, or a combination of both. For example, the functional modules may comprise a plurality or series of instructions to be executed by a processor in a hardware system, such as processor 502. Initially, the series of instructions may be stored on a storage device, such as mass storage 518. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communications interface 516. The instructions are copied from the storage device, such as mass storage 518, into memory 514 and then accessed and executed by processor 502.

An operating system manages and controls the operation of hardware system 500, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other implementations are possible. For example, the nickname generating functions described herein may be implemented in firmware or on an application specific integrated circuit.

Furthermore, the above-described elements and operations can be comprised of instructions that are stored on storage media. The instructions can be retrieved and executed by a processing system. Some examples of instructions are software, program code, and firmware. Some examples of storage media are memory devices, tape, disks, integrated circuits, and servers. The instructions are operational when executed by the processing system to direct the processing system to operate in accord with the invention. The term "processing system" refers to a single processing device or a group of inter-operational processing devices. Some examples of processing devices are integrated circuits and logic circuitry. Those skilled in the art are familiar with instructions, computers, and storage media.

The present invention has been explained with reference to specific embodiments. For example, while embodiments of the present invention have been described as operating in connection with a social network system, the present invention can be used in connection with any communications facility that allows for communication of messages between users, such as an email hosting site. In addition, while some embodiments have been described as operating in connection with a credit card transaction processing network and POS terminals, the present invention has application to a variety of systems that include mechanisms for detecting or reading physical tokens that are associated with users. Other embodiments will be evident to those of ordinary skill in the art. It is therefore not intended that the present invention be limited, except as indicated by the appended claims.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
by one or more computing devices of a proxy server, in response to receiving a message from a token reader, generating a federated session token in relation to the message;
by the one or more computing devices of the proxy server, sending a request for federated access to social-networking information of a first user of a social-networking system, wherein the request comprises the federated session token;
by one or more computing devices of the social-networking system, in response to receiving the request for federated access, validating the request based at least in part on one or more configuration settings associated with the first user;
by the one or more computing devices of the social-networking system, establishing a federated access session with the proxy server;

by the one or more computing devices of the proxy server, retrieving, by the federated access session, the social-networking information of the first user from the social-networking system.

2. The method of claim 1, wherein the federated access session expires upon reaching a specified time limit.

3. The method of claim 1, wherein:
the request for federated access further comprises a token-reader identifier received in the message from the token reader; and
the method further comprises mapping the token-reader identifier to access permissions associated with the first user.

4. The method of claim 1, wherein:
the request for federated access further comprises a token-reader identifier received in the message from the token reader; and
the method further comprises mapping the token-reader identifier to a third-party application.

5. The method of claim 1, further comprising:
by the one or more computing devices of the social-networking system, receiving content from the proxy server in conjunction with the federated access session; and
by the one or more computing devices of the social-networking system, posting the content to a user-profile page of the first user of the social-networking system, wherein the content is associated with the token reader.

6. The method of claim 1, further comprising, by the one or more computing devices of the social-networking system, receiving, from the proxy server, a request in conjunction with the federated access session to debit a virtual currency account of the first user.

7. The method of claim 1, wherein the proxy server is implemented on a computing system of the token reader.

8. A system comprising: one or more processors; and a memory coupled to the processors comprising instructions executable by the processors, the processors being operable when executing the instructions to:
in response to a proxy server receiving a message from a token reader, generate a federated session token in relation to the message;
send, from the proxy server to a social-networking system, a request for federated access to social-networking information of a first user of the social-networking system, wherein the request comprises the federated session token;
in response to the social-networking system receiving the request for federated access, validate the request based at least in part on one or more configuration settings associated with the first user;
establish a federated access session between the social-networking system and the proxy server;
retrieve, by the federated access session, the social-networking information of the first user from the social-networking system.

9. The system of claim 8, wherein the federated access session expires upon reaching a specified time limit.

10. The system of claim 8, wherein:
the request for federated access further comprises a token-reader identifier received in the message from the token reader; and
the processors are further operable when executing the instructions to map the token-reader identifier to access permissions associated with the first user.

11. The system of claim 8, wherein:
the request for federated access further comprises a token-reader identifier received in the message from the token reader; and
the processors are further operable when executing the instructions to map the token-reader identifier to a third-party application.

12. The system of claim 8, wherein the processors are further operable when executing the instructions to:
receive content from the proxy server in conjunction with the federated access session; and
post the content to a user-profile page of the first user of the social-networking system, wherein the content is associated with the token reader.

13. The system of claim 8, wherein the processors are further operable when executing the instructions to receive, from the proxy server, a request in conjunction with the federated access session to debit a virtual currency account of the first user.

14. The system of claim 8, wherein the proxy server is implemented on a computing system of the token reader.

15. One or more computer-readable non-transitory storage media embodying software that is operable when executed to:
in response to a proxy server receiving a message from a token reader, generate a federated session token in relation to the message;
send, from the proxy server to a social-networking system, a request for federated access to social-networking information of a first user of the social-networking system, wherein the request comprises the federated session token;
in response to the social-networking system receiving the request for federated access, validate the request based at least in part on one or more configuration settings associated with the first user;
establish a federated access session between the social-networking system and the proxy server;
retrieve, by the federated access session, the social-networking information of the first user from the social-networking system.

16. The media of claim 15, wherein the federated access session expires upon reaching a specified time limit.

17. The media of claim 15, wherein:
the request for federated access further comprises a token-reader identifier received in the message from the token reader; and
the software is further operable when executed to map the token-reader identifier to access permissions associated with the first user.

18. The media of claim 15, wherein:
the request for federated access further comprises a token-reader identifier received in the message from the token reader; and
the software is further operable when executed to map the token-reader identifier to a third-party application.

19. The media of claim 15, wherein the software is further operable when executed to:
receive content from the proxy server in conjunction with the federated access session; and
post the content to a user-profile page of the first user of the social-networking system, wherein the content is associated with the token reader.

20. The media of claim 15, wherein the software is further operable when executed to receive, from the proxy server, a request in conjunction with the federated access session to debit a virtual currency account of the first user.

21. The media of claim 15, wherein the proxy server is implemented on a computing system of the token reader.

* * * * *